June 23, 1953 J. F. CURRIVAN Re. 23,670

INTEGRAL CARTON FOR PROTECTION OF FRAGILE ARTICLES

Original Filed Oct. 27, 1948 3 Sheets-Sheet 1

INVENTOR.
John F. Currivan
BY
H. Lee Helms
ATTORNEY.

INTEGRAL CARTON FOR PROTECTION OF FRAGILE ARTICLES

Original Filed Oct. 27, 1948 3 Sheets-Sheet 2

INVENTOR.
John F. Currivan
By W. Lee Helms
ATTORNEY.

INTEGRAL CARTON FOR PROTECTION OF FRAGILE ARTICLES

Original Filed Oct. 27, 1948 3 Sheets-Sheet 3

INVENTOR
John F. Currivan

BY Strauch, Nolan & Diggins
ATTORNEYS

Reissued June 23, 1953

Re. 23,670

UNITED STATES PATENT OFFICE 23,670

INTEGRAL CARTON FOR PROTECTION OF FRAGILE ARTICLES

John F. Currivan, New York, N. Y.

Original No. 2,611,529, dated September 23, 1952, Serial No. 56,736, October 27, 1948. Application for reissue March 30, 1953, Serial No. 345,750

9 Claims. (Cl. 229—38)

Matter enclosed in heavy brackets [ ] appears in the original patent but forms no part of this reissue specification; matter printed in italics indicates the additions made by reissue.

The object of the present invention is to provide an inexpensive integral carton construction, affording protection for fragile articles, as, for example, radio tubes, such protection heretofore having required tubes of corrugated board to encircle such fragile articles in cartons.

A further object is to enable the packing of tubes of various diameters in one size cartons.

A further object of the invention is to provide such an integral carton construction, adequately protecting the fragile articles and yet of such form that the carton can be successfully erected, loaded and both ends closed by conventional automatic cartoning machines.

The invention will be described with reference to the accompanying drawings, in which.

Figure 1:
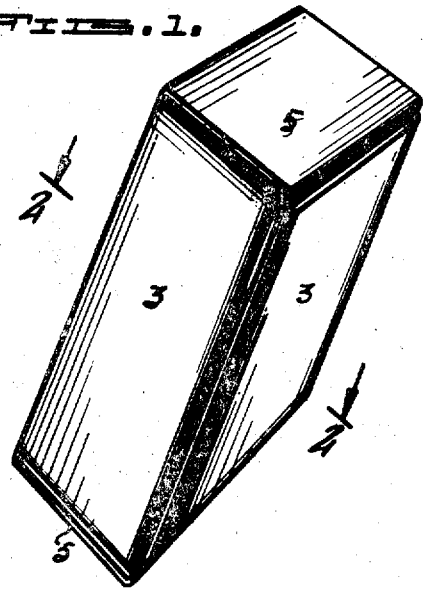
Fig. 1 is a perspective view of a closed carton embodying the invention.
Figure 2:
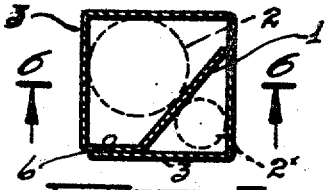
Fig. 2 is a transverse section through the structure of Fig. 1 on the line 2—2.
Figure 5:
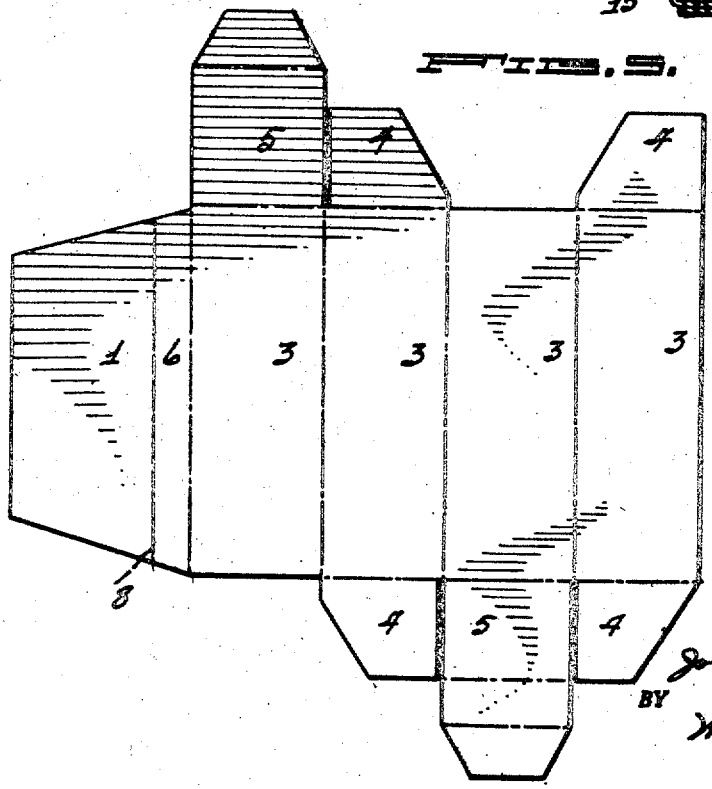
Fig. 5 illustrates a carton blank as erected in Fig. 2.
Figure 6:
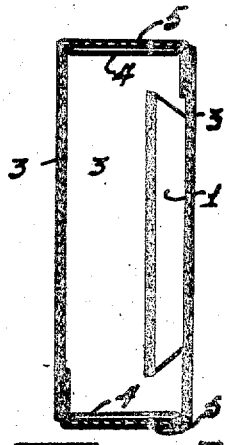
Fig. 6 is a vertical section on the line 6—6, Fig. 2.

Referring to the drawings and to the carton blank of Fig. 5, it will be seen by reference to Fig. 2 that when the blank is erected, it will provide an inner partition 1 adapted to separate two fragile articles 2x, as shown in Fig. 2, or to receive single fragile articles, such as radio tubes, of various diameters, because of the flexibility of the inner flap partition 1. The blank shown in Fig. 5 is formed with the usual side wall areas and at each end is provided with short closure flaps 4 which will underlie, as customary, outer and final closure flaps 5 for the top and bottom of the carton.

At one side of the blank there is provided the usual side wall lateral extension 6 which will normally underlie and be glued to the opposite outermost side wall section. Integral with such side wall gluing section 6 is the flexible and projected flap-partition 1, the latter usually being of such width that when the blank is erected into carton form, as shown in Fig. 2, the said flexible flap partition will, at its free edge, abut one of the side walls and will extend in a straight line. It will be understood, however, that the flap may be wider so that in its erected position, the partition flap will be put under compression and forced to assume a curved formation within the carton.

When a radio tube or other appropriate fragile article is inserted into the carton, the side wall area thereof will engage and deflect the flap partition 1 to an extent controlled by the diameter of such fragile article and a tight article-enclosing carton will be provided, the latter preventing such movement of the enclosed article, as to contribute, in such respect, to breakage. Also in multiple shipping of the cartons, they may be so arranged in the container that the flap partitions will hold the fragile articles so spaced from each other that breakage is avoided. Thus the large cartons holding a dozen or more of the individual cartons may be of light construction and of much lower cost than those heretofore employed.

Figure 3:
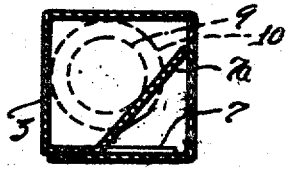
Fig. 3 is a view similar to Fig. 2, showing the use of a modified form of carton blank, which is shown in Fig. 9.
Figure 7:
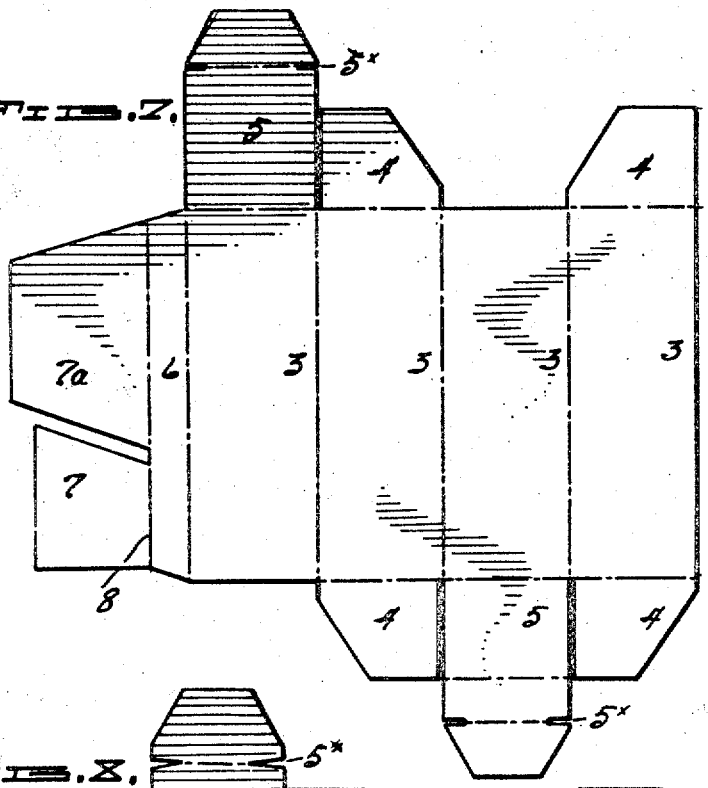
Fig. 7 shows the carton blank used in the structure of Fig. 10.
Figure 9:
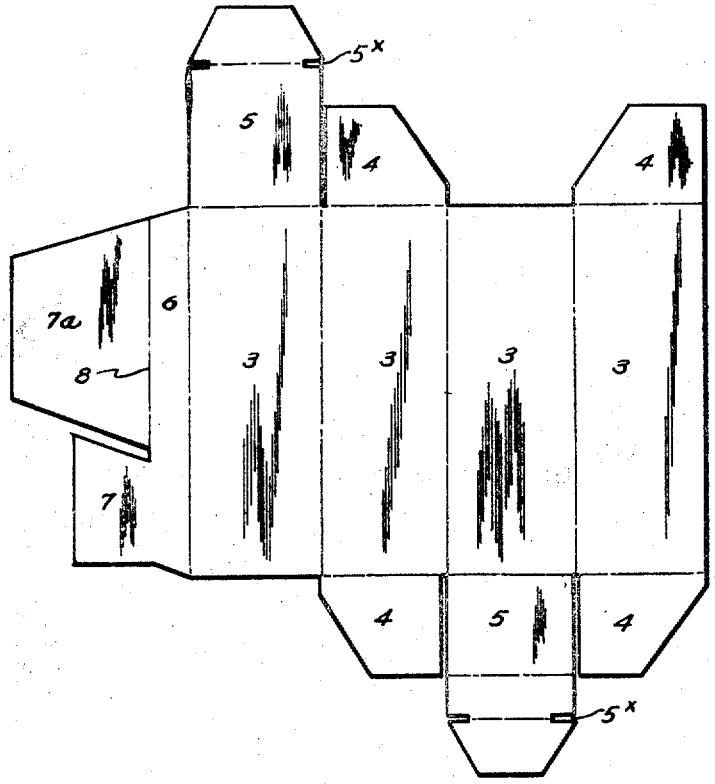
Fig. 9 shows the carton blank shown erected in Figure 3.
Figure 10:
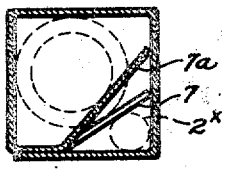
Figure 10 is a transverse sectional view of a carton erected from the blank of Figure 7.

In the structure of Fig. 9, shown erected in Fig. 3, the flap partition has been divided by a diagonal cut so that the flap partition has a major section 7a and an underlying minor section 7, which is not separated from the section 6 in a score line, and thus forms a continuation of the section 6 lying flat against the side wall 3. The carton, in other substantial respects, is the same as that of Fig. 5, although the end closure flaps are shown notched at 5x. Such a carton may be used in two ways. Thus when the base of a radio tube, or other fragile article, is of greater diameter than the upper structure of the tube, the score line 8 bounding the outer glue area for connection at the side walls in the erected carton, may extend, as shown in Fig. 7, across both of the flap areas 7a and 7, and when the carton is erected, the flaps will lie at different angles in the carton, as shown in Fig. 10. In Figures 3 and 10, the upper portion of a radio tube is indicated by the dotted line 9 as abutting flap section 7a, whereas the base area 10 of greater diameter may be unsupported as shown in Figure 3, or may abut the flap section 7, as shown in Figure 10. It will be apparent that a smaller article 2x may be supported in the carton of Figure 10 in a manner similar to that shown in Figure 2. However, when the article to be inserted in the carton is of such form as not to (2)

require the divisional effect of flap 7, the latter will not be scored on the line 8 beyond cross flap 7a, so that flap 7 will remain in full surface contact with the inner wall of the carton. The flap 7 thus maintains an even thickness from end to end of the body of the carton, when in its flat folded state, which is important in proper feeding from a stack of the cartons from the feed magazine of a cartoning machine.

Figure 4:
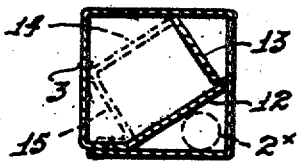
Fig. 4 is a view similar to Fig. 2 showing the use of the carton blank illustrated in Fig. 8.
Figure 8:
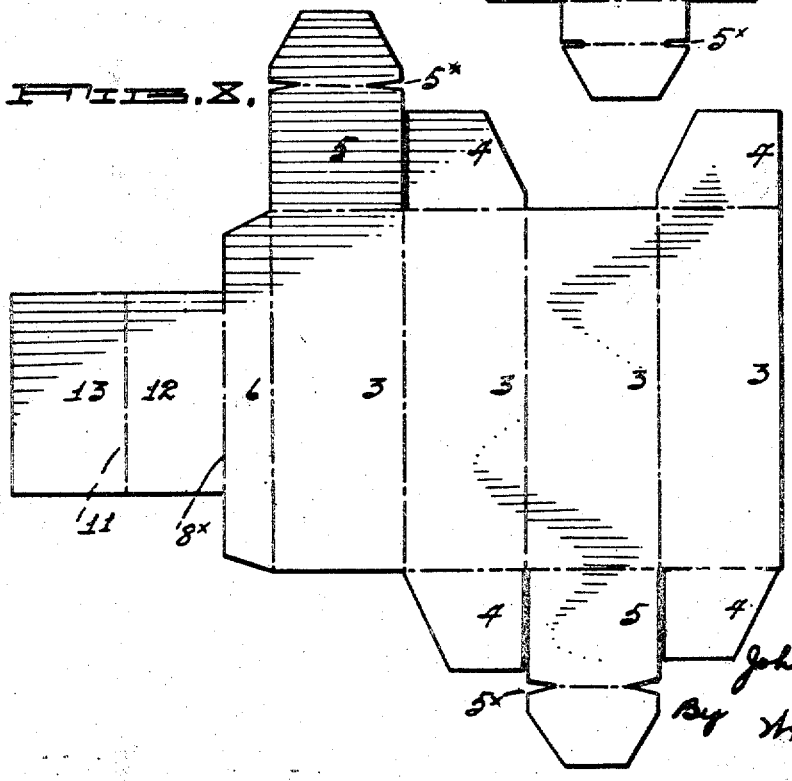
Fig. 8 shows the carton blank illustrated in Fig. 4.

In the structure of Figs. 4 and 8, the flap partition is inwardly bounded by the score line 8x and is provided with a second intermediate score line 11 to provide two contiguous partition flap sections 12 and 13. When the carton is erected, the carton folds back on itself at the score line 11 like a tent, which arrangement centers the tube in the carton, keeping it from contact with all of the side walls with the exception of one. The blank in Fig. 8 as to the top and bottom closure flaps may be substantially similar to the construction shown in Fig. 7 and hence the same reference numerals have been used for such parts.

It will be understood that various modifications may be made in the form and arrangement of the elements constituting the embodiments of the invention illustrated in the drawings, without departing from the spirit of the invention. In some cases the areas left vacant by the action of the flap partition may be utilized for the reception of small units, as indicated at 2x in Figs. 2–4 inclusive but ordinarily such spaces will not be utilized.

As a further modification, and referring to the blank of Fig. 8, the flap partition sections 12 and 13 may be increased to four so that a diamond shape protecting flap partition formation will be provided within the carton when the latter is erected, the two additional flap sections being indicated by dotted lines in Fig. 4 at 14 and 15.

I claim:

1. A carton comprising side walls, end walls, a plurality of partitions of different lengths attached to one of said side walls at a common hinge line, said partitions being bent to extend inwardly of the carton and angularly of said side walls and of each other, the free ends of said partitions freely and slidably abutting one of said side walls.

2. A carton comprising integrally connected side walls, one of said walls having an extension underlying a portion of an adjacent second side wall and secured thereto, said extension terminating at a hinge line, a first partition attached to said extension at said hinge line and extending angularly inwardly of said carton into free contact with the internal surface of said carton, and a second partition attached to said extension at said hinge line, said second partition being of different length than said first partition and extending along said second wall in full surface contact therewith.

3. A carton comprising integrally connected side walls, one of said walls having an extension underlying a portion of an adjacent second side wall and secured thereto, said extension terminating at a hinge line, a first partition attached to said extension at said hinge line and extending angularly inwardly of said carton into free contact with the internal surface of said carton, a second partition attached to said extension at said hinge line, said second partition being of different length than said first partition and so as to be disposed in said carton angularly of said first partition and extend inwardly of said second wall across a corner of said carton into slidable abutment with a third wall.

4. A collapsible carton of substantially rectangular cross-section fabricated from a single blank having first, second, third, and fourth side wall sections which are separated by fold lines and are angularly related in the erected carton, and end closure flaps; the first and fourth side wall sections being partially overlapped and rigidly secured together; an internal flap section extending integrally from the inner side wall section at said overlap, said flap section extending in a single plane in angular relation to the first side wall section, and having its free edge in sliding contact with the inner surface of the second side wall section and effectively providing a flexible inner wall section in the erected carton to yieldingly support an article therein, and a second internal flap section extending integrally from said inner side wall section at said overlap, said second flap section being shorter than the first flap section and likewise having its free edge in sliding contact with the inner surface of the said second side wall.

5. An integral carton of substantially rectangular cross-section for the protection of fragile articles consisting of a single blank having first, second, third, and fourth side wall panels which are separated by fold lines and are angularly related in the erected carton, at least two end closure flaps having foldable extensions, said end closure flaps integrally extending from the ends of certain of said first, second, and fourth side wall panels only, additional [and] *end* closure flaps extending integrally from the opposite ends of two of the side wall panels which are opposed in the erected carton and, in the erected carton, are immediately adjacent the panels to which said first mentioned end closure flaps are attached, said end closure flaps being adapted to provide end walls of the erected closed carton, a glue lap extending from said fourth side wall panel and adapted to be overlapped by said first side wall panel and be rigidly secured thereto, and an internal flap panel extending integrally from said glue lap in angular relation to said first side wall panel in the erected carton and terminating in a free end in sliding contact with the inner surface of [said second] *one of said* side wall [panel] *panels* to provide a flexible inner wall panel in the erected carton to yieldingly support an article therein, said inner flap panel having at least one lateral edge portion inclined with respect to the fold lines whereby an article being inserted into the carton exerts *a* [the] camming action against said edge portion to facilitate the loading of said carton.

6. The carton according to claim 5 together with an additional internal flap panel extending integrally from said glue lap in angular relation with the first-mentioned flap panel.

7. The carton of claim 6 wherein the combined width of said glue lap and the said additional internal flap panel is less than the width of said first side wall panel whereby said additional flap panel is adapted to lie in full surface contact with said first side wall panel.

8. A carton according to claim 6 wherein said additional internal flap panel also extends in angular relation to said first side wall panel in the erected carton and terminates in a free edge in sliding contact with the inner surface of said second side wall panel to provide an additional flexible inner wall panel in the erected carton.

9. A collapsible carton for the protection of fragile articles fabricated from a single blank having first, second, third and fourth side wall sections which are separated by fold lines and are angularly related in the erected carton, and end closure flaps; the first and fourth side wall sections being partially overlapped and rigidly secured together; a first internal flap section extending integrally from the inner side wall section at said overlap, said first flap section extending in a single plane in angular relation to said first side wall section and having its free edge in sliding contact with the inner surface of the second side wall section and effectively providing a flexible inner wall section in the erected carton to yieldingly support an article therein, and a second flap section extending integrally from said inner side wall section at said overlap, said second flap section being shorter than said first flap section and adapted to lie in full surface contact with said first side wall section in the erected carton.

JOHN F. CURRIVAN.

References Cited in the file of this patent or the original patent

UNITED STATES PATENTS

| Number | Name | Date |
|---|---|---|
| 1,112,752 | Avellanal | Oct. 6, 1914 |
| 1,737,950 | Scotland | Dec. 3, 1929 |
| 2,008,949 | Ellsworth | July 23, 1935 |
| 2,129,198 | Crouch et al. | Sept. 6, 1938 |
| 2,367,345 | Fischer | Jan. 16, 1945 |
| 2,539,966 | Orovig | Jan. 30, 1951 |

FOREIGN PATENTS

| Number | Country | Date |
|---|---|---|
| 256,037 | Great Britain | of 1926 |
| 258,925 | Great Britain | Feb. 25, 1926 |